(12) United States Patent
Ikuta et al.

(10) Patent No.: US 11,305,762 B2
(45) Date of Patent: Apr. 19, 2022

(54) DRIVING ASSISTANCE APPARATUS

(71) Applicant: Toyota Jidosha Kabushiki Kaisha, Toyota (JP)

(72) Inventors: Tetsuya Ikuta, Nisshin (JP); Yuma Hoshikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 16/822,235

(22) Filed: Mar. 18, 2020

(65) Prior Publication Data
US 2020/0298844 A1 Sep. 24, 2020

(30) Foreign Application Priority Data

Mar. 20, 2019 (JP) .............................. JP2019-052863

(51) Int. Cl.
| | |
|---|---|
| *B60W 30/09* | (2012.01) |
| *B60R 11/04* | (2006.01) |
| *B60R 21/013* | (2006.01) |
| *B60W 40/02* | (2006.01) |
| *G05D 1/02* | (2020.01) |

(52) U.S. Cl.
CPC .............. *B60W 30/09* (2013.01); *B60R 11/04* (2013.01); *B60R 21/013* (2013.01); *B60W 40/02* (2013.01); *G05D 1/0214* (2013.01); *G05D 2201/0212* (2013.01); *G05D 2201/0213* (2013.01)

(58) Field of Classification Search
CPC ..... G01S 13/867; B60W 30/09; B60R 21/013
See application file for complete search history.

(56) References Cited

U.S. PATENT DOCUMENTS

| | | | |
|---|---|---|---|
| 2017/0096138 A1* | 4/2017 | Reiff ................. | B60W 30/0956 |
| 2017/0227640 A1* | 8/2017 | Nomura ................. | G01S 7/526 |
| 2018/0090006 A1* | 3/2018 | Ikenouchi ............... | G01S 17/86 |
| 2019/0023267 A1 | 1/2019 | Takagi et al. | |

FOREIGN PATENT DOCUMENTS

JP 2015-121960 A 7/2015

* cited by examiner

*Primary Examiner* — Peter D Nolan
*Assistant Examiner* — Tarek Elarabi
(74) *Attorney, Agent, or Firm* — Dinsmore & Shohl LLP (57) ABSTRACT

A driving assistance apparatus comprising a first object detecting sensor device, a second object detecting sensor device, and a control unit. The first object detecting sensor device detects an object and obtains the position and a certainty value of the object. The second object detecting sensor device detects an object and obtains the position and an object type for the object. The control unit executes collision avoidance control to avoid collision between a vehicle and a monitoring target object which is detected by the first object detecting sensor device when the certainty value of the monitoring target object is higher than a certainty threshold. If the monitoring target object is also detected by the second object detecting sensor device and its object type is a specific type, the certainty threshold is made larger.

6 Claims, 5 Drawing Sheets

DRIVING ASSISTANCE APPARATUS

CROSS REFERENCE TO RELATED APPLICATIONS

This nonprovisional application claims priority to Japanese Patent Application No. 2019-052863 filed with the Japan Patent Office on Mar. 20, 2019, the entire contents of which are hereby incorporated by reference.

TECHNICAL FIELD

The present disclosure relates to a driving assistance (support) apparatus configured to execute collision avoidance control, when an object present in a travelling direction of a vehicle is detected, in order to avoid a collision between the vehicle and the object.

BACKGROUND

One conventionally known driving assistance apparatus of such a kind which is applied to a vehicle (hereinafter also referred to as the "conventional apparatus") is equipped with an ultrasonic sonar apparatus as an object detection apparatus. In addition, the conventional apparatus executes the collision avoidance control (specifically, control for generating an alert) when an object in the travelling direction of the vehicle is detected by the ultrasonic sonar apparatus. Furthermore, the conventional apparatus estimates the travelling direction of the vehicle by using a navigation device and enhances detection sensitivity of the ultrasonic sonar apparatus to detect an object which is present in the estimated travelling direction (see, for example, Japanese Patent Application Laid-Open (kokai) No. 2015-121960).

SUMMARY

Incidentally, reliability of the position with respect to a vehicle obtained by an object detection apparatus such as an ultrasonic sonar apparatus may vary depending on a type of object in some cases. Hereinafter, a value indicative of the above-described reliability will be referred to as a "detection certainty value," or a "certainty value" for simplification.

For example, as for the ultrasonic sonar apparatus, the certainty value concerning a wall of a building detected as an object is generally higher than the certainty value concerning a pedestrian detected as another object. The reason for this is as follows. The ultrasonic sonar apparatus transmits a wave. The transmitted wave are reflected by an object to be a reflection wave. The ultrasonic sonar apparatus receives the reflection wave to detect the object. The strength of the reflection wave from the wall is higher than that of the reflection wave from the pedestrian.

Hereinafter, an object which tends to provide the certainty value which is relatively large will be referred to as a "high certainty object," and an object which tends to provide the certainty value which is relatively small will be referred to as a "low certainty object." In addition, an object which needs to be monitored in order to determine whether or not it is necessary to execute the collision avoidance control for that object also referred to as a "monitoring target object."

If the driving assistance apparatus treats (regards) the low certainty object, as well as the high certainty object, as the monitoring target object, there is a relatively high possibility that the collision avoidance control is erroneously executed for an object which is not present in the travelling direction of the vehicle in actuality. Namely, there is the possibility that unnecessary collision avoidance control (hereinafter also referred to as "unnecessary control") is executed in this case. Meanwhile, if the driving assistance apparatus treats only the high certainty object as the monitoring target object, there is another relatively high possibility that the collision avoidance control is not executed for an object (in this case, the low certainty object) which is actually present in the travelling direction of the vehicle. However, in the conventional apparatus, it is not considered to appropriately extract the monitoring target object on the basis of the detection certainty value.

In view of the forgoing, one object of the present disclosure is to provide a driving assistance apparatus configured to be able to execute the collision avoidance control for not only the high certainty object but also the low certainty object while avoiding occurrence of the unnecessary control.

A driving assistance apparatus for achieving the above-described object (hereinafter also referred to as the "apparatus of the present disclosure") comprises a first object detecting sensor device (a sonar apparatus 33), a second object detecting sensor device (a front camera 31), and a control unit (a PCS-ECU 21 and an ICS-ECU 22). The control unit may be implemented by at least one programmed processor whose operation is determined by a predetermined program, gate arrays and the like.

The first object detecting sensor device detects an object present in a travelling direction of a vehicle (10) as a "first object" (sonar detected object), and obtains a position (a longitudinal position Dsx(c) and a lateral position Dsy(c)), and a "certainty value" (Cv) of the first object such that the certainty value increases as reliability of the obtained position increases.

The control unit is configured to determine whether or not a monitoring target object satisfies a predetermined executing condition on the basis of at least said position obtained by said first object detecting sensor device. The monitoring target object is one of the first objects, and whose certainty value is determined to be higher than a certainty threshold (a first certainty threshold Cth1 and a second certainty threshold Cth2). The control unit is configured to execute collision avoidance control in order to avoid collision between said monitoring target object and said vehicle (step 535 of FIG. 5) when it is determined that said monitoring target object satisfies said executing condition.

The second object detecting sensor device detects an object present in the travelling direction as a "second object" (camera detected object), obtains a position (a longitudinal position Dcx(a) and a lateral position Dcy(a)) of the second object and information on a type of the second object. The second object detecting sensor device may determine (or obtain a determination result as to) whether or not a type of the second object is a "specific type" (for example, a "pedestrian").

Furthermore, the control unit is configured to:
obtain determination result as to whether or not the type of the second object is a specific type;
determine whether or not the second object is also detected as the first object on the basis of the obtained position of the first object and the obtained position of the second object (a condition (f2));
determine whether or not a threshold application condition is satisfied, the threshold application condition including a condition which is satisfied when it is determined that the second object is also detected as the first object and it is determined that the type of the second object is the specific type (a condition (c2));

adopt (use) a predetermined first certainty threshold (Cth1) as the certainty threshold (that is, set the certainty threshold to the first certainty threshold) when it is determined that the threshold application condition is not satisfied (a condition (e3)); and adopt (use) a predetermined second certainty threshold (Cth2) which is smaller than the first certainty threshold as the certainty threshold (that is, set the certainty threshold to the second certainty threshold) when it is determined that the threshold application condition is satisfied (a condition (f1)).

The first certainty threshold is set to a value smaller than the certainty value which is obtained when the first object detecting sensor device detects the high certainty object. Meanwhile, second certainty threshold is set to a value smaller than the certainty value which is obtained when the first object detecting sensor device detects the low certainty object. When the second object is a specific kind of the low certainty object (for example, a pedestrian), the type of that second object is determined to be the specific type.

Therefore, if an object which is detected by the first object detecting sensor device is determined to be the low certainty object, the second certainty threshold, which is smaller than the first certainty threshold, is adopted (used) as the certainty threshold. Accordingly, although an object which is present in the travelling direction of the vehicle is the low certainty object, that low certainty object will be treated as the monitoring target object. Meanwhile, when an object which is present in the travelling direction of the vehicle is not the low certainty object, the first certainty threshold is adopted (used) as the certainty threshold, and thus occurrence of the unnecessary control can be avoided appropriately.

In another aspect of the apparatus of the present disclosure, the control unit is configured to determine whether or not said second object has continuously been detected by said second object detecting sensor device for a time period longer than a predetermined time threshold (first duration time threshold Td1) in order to determine whether or not said threshold application condition is satisfied (a condition (c3)).

According to the present aspect, occurrence of the unnecessary control which is caused due to incorrect detection of the second object can be avoided appropriately.

Furthermore, the first object detecting sensor device may comprise a "transmission section" which transmits an electromagnetic wave or a sonic wave as a "transmission wave" to a predetermined object detecting region and a "reception section" which receives a "reflection wave" generated by reflection of the transmission wave at the first object, and may be configured to obtain the certainty value on the basis of at least strength of the reflection wave.

In addition, the second object detecting sensor device may comprise an image obtaining section which obtains (captures) an image of a region in the travelling direction as a "travelling direction image," and may be configured to determine whether or not the type of the second object is the specific type by using the travelling direction image.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION (Configuration)

A driving assistance apparatus according to an embodiment of the present disclosure (hereinafter also referred to as the "present assistance apparatus") will now be described with reference to the drawings. The present assistance apparatus is applied to a vehicle 10 shown in FIG. 1. As understood from FIG. 2 illustrating a block diagram of the present assistance apparatus, the present assistance apparatus includes "a PCS-ECU 21, an ICS-ECU 22, an engine ECU 23, a brake ECU 24, and an HMI-ECU 25" each of which is an electronic control unit (ECU). "PCS" stands for "Pre-Crush Safety." "ICS" stands for "Intelligent Clearance Sonar." "HMI" stands for "Human Machine Interface."

The PCS-ECU 21 includes a micro-computer, as a major component, which is equipped with a CPU, a non-volatile memory and a RAM. The CPU performs data reading, numerical computation, computation result output, and so on by repeatedly executing predetermined programs (routines). The non-volatile memory is formed by a flash memory and stores the programs executed by the CPU, lookup tables (maps) read by the CPU during execution of the programs, and so on. The RAM stores data read by the CPU temporarily.

Each of the ICS-ECU 22, the engine ECU 23, the brake ECU 24, and the HMI-ECU 25 includes a micro-computer as a major component similarly to the PCS-ECU 21. These ECUs can perform data communication (can exchange data) with one another through a CAN (controller area network) 26. In addition, each ECU can receive "output values of a sensor connected to one of the other ECUs" through the CAN 26 from that ECU to which the sensor is connected.

The PCS-ECU 21 is connected to a front camera 31 (specifically, an image processing section 31b described later) and a radar apparatus 32 (specifically, a radar control section 32c described later). The ICS-ECU 22 is connected to a sonar apparatus 33 (specifically, a sonar control section 33e described later).

(Configuration—Front Camera)

Figure 1:
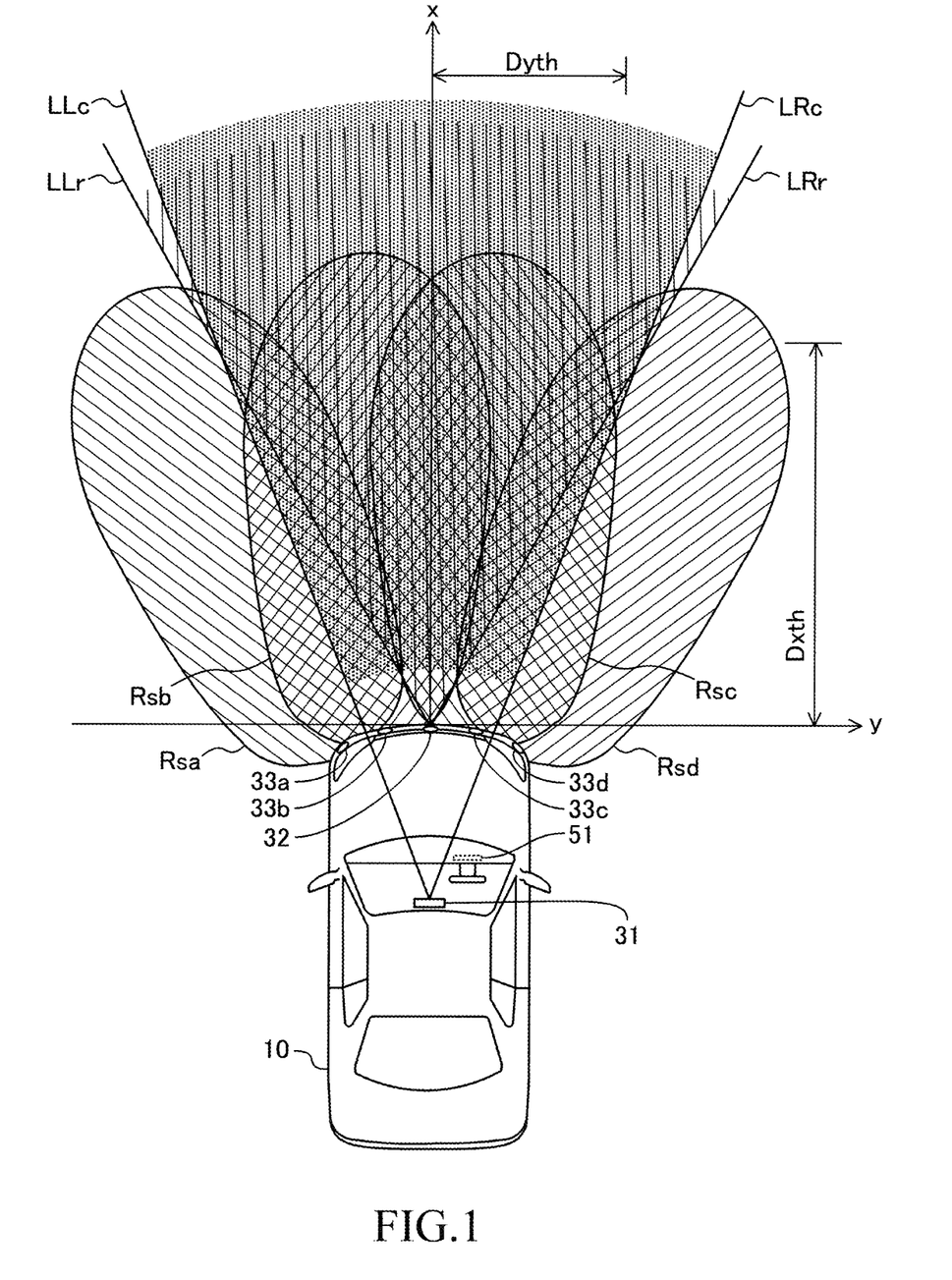
FIG. 1 is a schematic diagram of a vehicle (present vehicle) on which a driving assistance apparatus according to an embodiment of the present disclosure (present assistance apparatus) is mounted.
Figure 2:
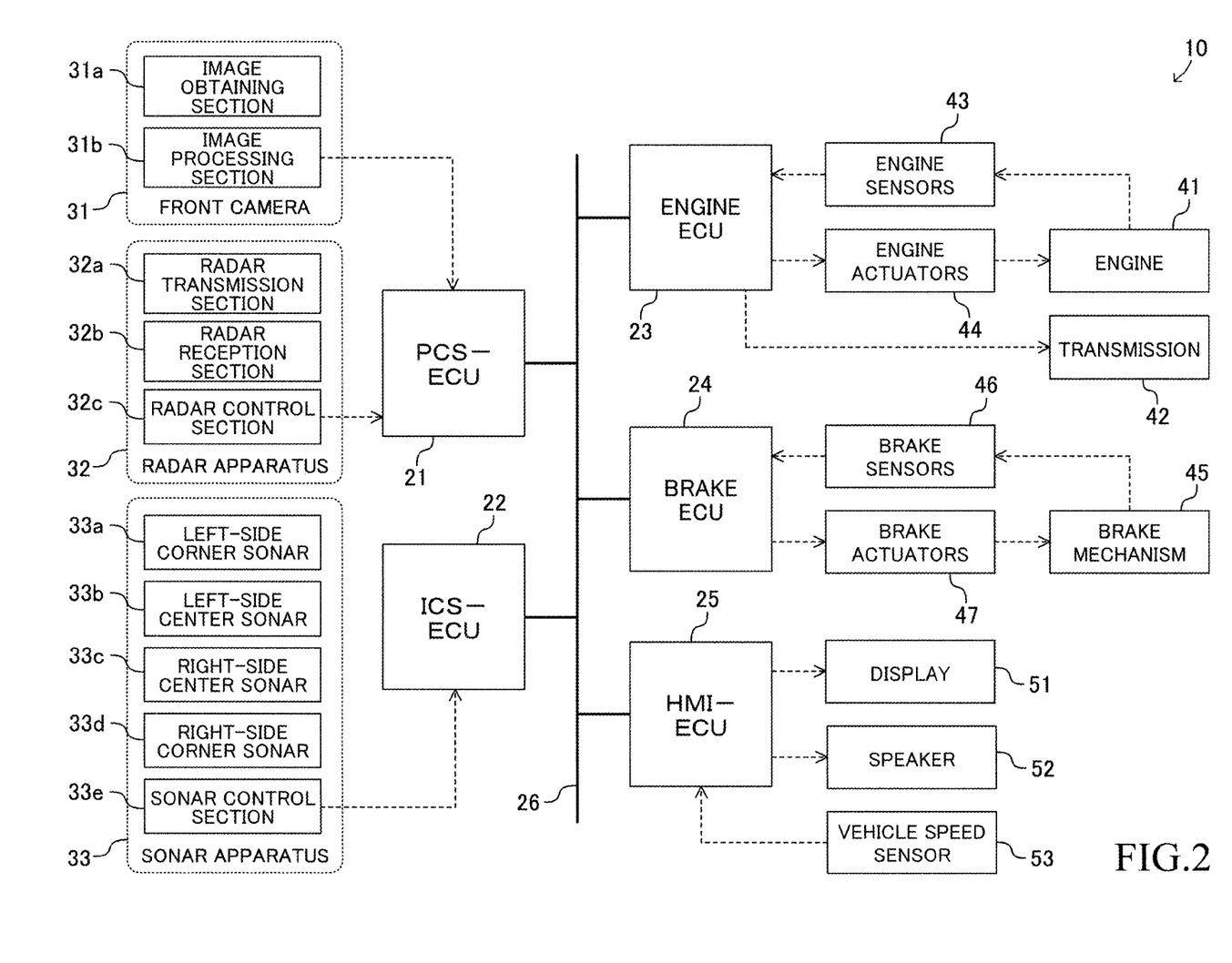
FIG. 2 is a block diagram of the present vehicle.

As shown in FIG. 1, the front camera 31 is disposed in the vicinity of an unillustrated rearview mirror attached on the cabin side of a front windshield of the vehicle 10 and at a center upper portion of the front windshield. As shown in FIG. 2, the front camera 31 includes an image obtaining section 31a and the image processing section 31b. The front camera 31 may be one of examples of a second object detecting sensor device (apparatus). The image obtaining section 31a obtains/captures an image (image data) of an object(s) (including a landscape) in front of (ahead of) the vehicle 10 as a "travelling direction image" every time a predetermined time interval ΔTc (fixed value) elapses, and outputs the travelling direction image to the image processing section 31b. The angle of view (field of view) of the image obtaining section 31a in the lateral direction is approximately equal to the angle formed between a straight line LRc and a straight line LLc, both shown in FIG. 1. The front camera 31 is also referred to as a "second object detecting sensor" for convenience' sake.

Hereinafter, the latest travelling direction image (namely, the travelling direction image which was last obtained by the image obtaining section 31a) will also be referred to as a "latest image." In addition, the travelling direction image which was obtained just before the latest image (namely, the travelling direction image obtained the time interval ΔTc before the latest image was obtained) will also be referred to as a "previous image."

Notably, as shown in FIG. 1, the longitudinal direction of the vehicle 10 (the front-back direction) is defined as an x axis, and the lateral direction of the vehicle 10 (the width direction) is defined as a y axis. The x axis and the y axis are orthogonal to each other. The lateral center of the front end of the vehicle 10 is the origin where x=0 and y=0. The x coordinate assumes a positive value on one side of the origin toward the forward direction of the vehicle 10 and assumes a negative value on the other side of the origin toward the backward direction of the vehicle 10. The y coordinate assumes a positive value on the right side with respect to the heading direction of the vehicle 10 moving forward and assumes a negative value on the left side with respect to the heading direction of the vehicle 10 moving forward.

The image processing section 31b extracts (detects) an object(s) (for example, another vehicle (other vehicles), a pedestrian(s), or the like) contained in the travelling direction image every time the time interval ΔTc elapses. Hereinafter, the object extracted by the front camera 31 will also be referred to as the "camera detected object" or "object (a)." The "a" within the parentheses is an identifier which is assigned to each camera detected object by the image processing section 31b.

When a plurality of objects are extracted from the travelling direction image, the image processing section 31b assigns different (unique) identifiers to the objects from each other. In addition, if an object contained in the latest image was also contained in the previous image, the image processing section 31b assigns the object contained in the latest image an identifier which is the same as the "identifier assigned to that object contained in the previous image".

In order to extract an object from the travelling direction image, the image processing section 31b searches for a partial region of the travelling direction image which is similar to any one of various templates (specifically, patterns of other vehicles, pedestrians, or the like) stored in advance. If the image processing section 31b finds the partial region of the travelling direction image similar to one of the templates (namely, the portion of the travelling direction image corresponding to the object (template)), the image processing section 31b extracts a contour (outline) of the object contained in the travelling direction image related to that template. Namely, the image processing section 31b extracts an object included in the travelling direction image by pattern matching processing.

In addition, the image processing section 31b obtains a type of the template which is determined to be similar to the object contained in the travelling direction image as a type of the object (object type). For example, when an object (a) which is determined to be similar to a template of a pedestrian is extracted, the image processing section 31b determines that the object type of the object (a) is a "pedestrian." The "pedestrian" as the object type is also referred to as a "specific type" for convenience' sake.

Furthermore, the image processing section 31b obtains a position (location) of the object (a) (namely, the relative position with respect to the vehicle 10) on the basis of the position of the object (a) in the travelling direction image. The position (location) of the object (a) is represented (expressed) by a pair (combination) of a longitudinal position Dcx(a) which is the x coordinate value of the object (a) and a lateral position Dcy(a) which is the y coordinate value of the object (a).

In order to obtain the position (location) of the object (a), the image processing section 31b obtains an image longitudinal position Px(a) and an image lateral position Py(a). The image longitudinal position Px(a) and the image lateral position Py(a) will next be described with reference to an example shown in FIG. 3.

Figure 3:
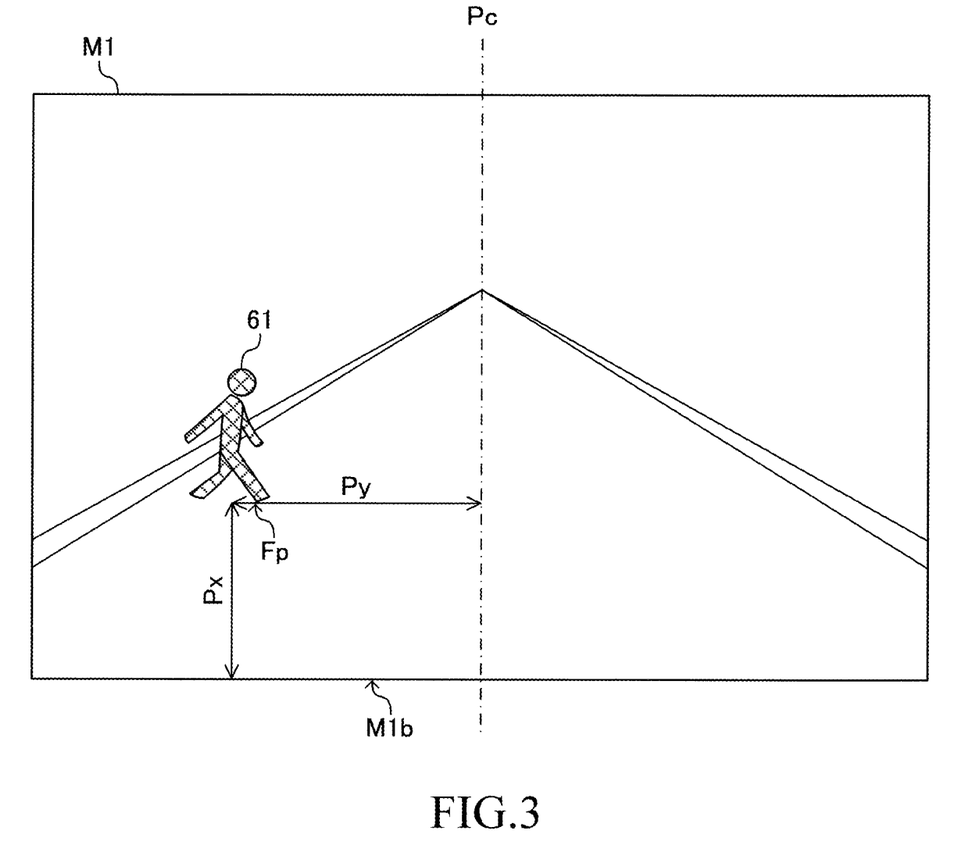
FIG. 3 is an example of an image (travelling direction image) obtained by a front camera which includes a pedestrian.

A travelling direction image M1 shown in FIG. 3 is an example of the travelling direction image. A pedestrian 61 which is the camera detected object has been extracted from the travelling direction image M1 and the identifier "61" has been assigned to this object in this example. As shown in FIG. 3, the image longitudinal position Px(61) is a value indicative of the length in the longitudinal direction between "the lower end Fp of the pedestrian 61 in the travelling direction image M1" and "the lower end M1b of the travelling direction image M1." The magnitude |Py(a)| of the image lateral position Py(61) is a value indicative of the length in the lateral direction between "the center of the pedestrian 61 in the lateral direction" and "a center line Pc which is the center line of the travelling direction image in the lateral direction."

The value of the image longitudinal position Px(a) is "0" when the lower end of the pedestrian (namely, the camera detected object) is located at the lower end of the travelling direction image. The value of the image longitudinal position Px(a) becomes greater as the lower end of the pedestrian becomes higher/upper in the travelling direction image. Meanwhile, the image lateral position Py(a) is "0" when the center of the pedestrian in the lateral direction is located on the center line Pc. When the center of the pedestrian in the lateral direction is located on the right hand side of the center line Pc, the image lateral position Py(a) assumes a positive value. The image lateral position Py(a) becomes greater as the center of the pedestrian in the lateral direction is located more away from the center line Pc in the rightward direction. In addition, when the center of the pedestrian in the lateral direction is located on the left hand side of the center line Pc, the image lateral position Py(a) assumes a negative value. The magnitude |Py(a)| of the image lateral position Py(a) becomes greater as the center of the pedestrian in the lateral direction is located more away from the center line Pc in the leftward direction.

The image processing section 31b obtains (calculates) the longitudinal position Dcx(a) and the lateral position Dcy(a) on the basis of the image longitudinal position Px(a) and the image lateral position Py(a). Specifically, the greater the image longitudinal position Px(a) becomes, the greater the longitudinal position Dcx(a) becomes. The greater the magnitude |Py(a)| of the image lateral position Py(a) becomes, the greater the magnitude |Dcy(a)| of the lateral position Dcy(a) becomes. In addition, the greater the image longitudinal position Px(a) becomes, the greater the magnitude |Dcy(a)| of the lateral position Dcy(a) becomes.

In view of the above, the image processing section 31*b* obtains the longitudinal position Dcx(a) by applying the image longitudinal position Px(a) to a lookup table which defines a relationship between the image longitudinal position Px and the longitudinal position Dcx. In addition, the image processing section 31*b* obtains the lateral position Dcy(a) by applying the image longitudinal position Px(a) and the image lateral position Py(a) to a lookup table which defines a relationship between "a combination of the image longitudinal position Px and the image lateral position Py" and "the lateral position Dcy". The above lookup tables have been stored in advance.

The image processing section 31*b* transmits "camera object information" to the PCS-ECU 21 every time the time interval ΔTc elapses. The camera object information includes "the position, the identifier and the object type" of the camera detected object when the camera detected object is extracted. When a plurality of the camera detected objects are extracted, the camera object information includes a plurality of combinations of "the position, the identifier and the object type" for each of the camera detected objects.

(Configuration—Radar Apparatus)

As shown in FIG. 1, the radar apparatus 32 is disposed at the center of the front end of the vehicle 10. The radar apparatus 32 can detect an object(s) in a region which is approximately equal to a range represented by an angle formed between a straight line LRr and a straight line LLr in the horizontal direction.

As shown in FIG. 2, the radar apparatus 32 includes a radar transmission section 32*a*, a radar reception section 32*b*, and a radar control section 32*c*. The radar transmission section 32*a* transmits a millimeter wave (electromagnetic wave whose frequency falls within the range of 30 GHz to 300 GHz) as a "radar transmission wave" in accordance with instructions from the radar control section 32*c*. The radar reception section 32*b* includes a plurality of reception antennas (not shown).

When the reception antennas receive a reflected wave (radar reflected wave) generated by reflection of the radar transmission wave at an object, the radar reception section 32*b* outputs information about the radar reflected wave (radar reflected wave information) to the radar control section 32*c*.

The radar control section 32*c* executes "radar object detection processing" every time a predetermined time interval ΔTr (fixed value) elapses. The radar object detection processing is processing to detect an object(s) and to obtain (figure out) the position (location) of the object (relative position with respect to the vehicle 10) and the speed of the object (relative speed with respect to the vehicle 10), on the basis of "strength, the frequency and the phase of the radar reflected wave," "the time difference from the transition of the radar transmission wave to the reception of the radar reflected wave," and the like.

Hereinafter, the object detected by the radar apparatus 32 will also be referred to as the "radar detected object" or "object (b)." The "b" within the parentheses is an identifier which is assigned to each radar detected object by the radar control section 32*c*.

When a plurality of radar detected objects are detected, the radar control section 32*c* assigns different (unique) identifiers to the objects from each other. In addition, if an object detected by the radar object detection processing has also been detected when the radar object detection processing was executed last time (namely, the detected object was also detected the time interval ΔTr before), the radar control section 32*c* assigns the detected object an identifier which is the same as the identifier assigned to the object detected when the radar object detection processing was executed last time.

The radar control section 32*c* transmits "radar object information" to the PCS-ECU 21 after execution of the radar object detection processing. When a radar detected object is detected, the radar object information includes "the position and the speed" of the radar detected object with respect to the vehicle 10, and the identifier of the radar detected object. When a plurality of the radar detected objects are detected, radar object information includes a plurality of combinations of "the position, the speed and the identifier" for each of the radar detected objects. The speed of the radar detected object contained in the radar object information includes a longitudinal relative speed Vrx(b) described later.

The position (location) of an object (b) is represented (expressed) by a pair/combination of a longitudinal position Drx(b) which is the x coordinate value of the object (b) and a lateral position Dry(b) which is the y coordinate value of the object (b). The speed of an object (b) is represented (expressed) by a pair of the longitudinal relative speed Vrx(b) which is the variation (change amount) in the longitudinal position Drx(b) per unit time and a lateral relative speed Vry(b) which is the variation (change amount) in the lateral position Dry(b) per unit time.

(Configuration—Sonar Apparatus)

The sonar apparatus 33 includes a left-side corner sonar 33*a*, a left-side center sonar 33*b*, a right-side center sonar 33*c*, a right-side corner sonar 33*d* and a sonar control section 33*e*. The sonar apparatus 33 is also referred to as a "first object detecting sensor" or a "first object detecting sensor device (apparatus)" for convenience' sake.

As shown in FIG. 1, the left-side corner sonar 33*a* is disposed at the left-front corner of the vehicle 10. The left-side corner sonar 33*a* can detect an object(s) present in a region approximately represented by a region Rsa in FIG. 1. The left-side center sonar 33*b* is disposed at the front end of the vehicle 10 and located on the left side of the center. The left-side center sonar 33*b* can detect an object(s) present in a region approximately represented by a region Rsb.

The right-side center sonar 33*c* is disposed at the front end of the vehicle 10 and located on the right side of the center. The right-side center sonar 33*c* can detect an object(s) present in a region approximately represented by a region Rsc. The right-side corner sonar 33*d* is disposed at the right-front corner of the vehicle 10. The right-side corner sonar 33*d* can detect an object(s) present in a region approximately represented by a region Rsd. Each of the region Rsa, the region Rsb, the region Rsc and the region Rsd is also referred to as a "object detection region" for convenience' sake.

Each of the left-side corner sonar 33*a*, the left-side center sonar 33*b*, the right-side center sonar 33*c* and the right-side corner sonar 33*d* includes a sonar transmission section, and a sonar reception section (both are not shown). Each of the sonar transmission sections transmits an ultrasonic wave as "sonar transmission wave" in response to an instruction from the sonar control section 33*e*. When the sonar reception section receives a reflected wave (sonar reflected wave) generated by reflection of the sonar transmission wave at an object, the sonar reception section outputs information about the sonar reflected wave such as the frequency and strength of the sonar reflected wave (sonar reflected wave information) to the sonar control section 33e.

The sonar control section 33e executes "sonar object detection processing" every time a predetermined time interval ΔTs (fixed value) elapses. The sonar object detection processing is processing to detect an object(s) and to obtain (figure out) the position of the object (relative position with respect to the vehicle 10) and the speed of the object (relative speed with respect to the vehicle 10), on the basis of the sonar reflected wave information sent from the sonar reception sections.

Hereinafter, an object detected by the sonar apparatus 33 will also be referred to as a "sonar detected object" or "object (c)." The "c" within the parentheses is an identifier which is assigned to each sonar detected object by the sonar control section 33e.

When a plurality of sonar detected objects are detected, the sonar control section 33e assigns different (unique) identifiers to the objects from each other. In addition, if an object detected by the sonar object detection processing has also been detected when the sonar object detection processing was executed last time (namely, the detected object was also detected the time interval ΔTs before), the sonar control section 33e assigns the detected object an identifier which is the same as the identifier assigned to the object detected when the sonar object detection processing was executed last time.

When an object (c) is detected in the sonar object detection processing, the sonar control section 33e obtains "the position (location) and the speed" of the object (c) with respect to the vehicle 10, and a certainty value Cv(c) of the object (c). The position of an object (c) is represented (expressed) by a pair/combination of a longitudinal position Dsx(c) which is the x coordinate value of the object (c) and a lateral position Dsy(c) which is the y coordinate value of the object (c). The speed of an object (c) is represented (expressed) by a pair/combination of a longitudinal relative speed Vsx(b) which is the variation (change amount) in the longitudinal position Dsx(b) per unit time and a lateral relative speed Vsy(b) which is the variation (change amount) in the lateral position Dry(c) per unit time.

The certainty value Cv(c) represents (indicates) reliability (certainty) of the obtained position of an object (c) (namely, a pair/combination of the longitudinal position Dsx(c) and the lateral position Dsy(c)). The higher the reliability of the position of an object (c) is, the greater the certainty value Cv(c) is. The certainty value Cv(c) falls within the range of "0" to a predetermined maximum certainty value Cmax which is a positive constant value.

The sonar control section 33e sets the certainty value Cv(c) to a value which becomes greater (increases) as the strength of the sonar reflected wave generated by reflection of the sonar transmission wave at the object(c) increases. In addition, the sonar control section 33e set the certainty value Cv(c) such that the certainty value Cv(c) becomes greater (increases) as the time period during which the object (c) has been continuously (successively) detected is longer.

In general, the greater the reflectance of the sonar transmission wave on a surface of an object (c) which faces to the vehicle 10 is, the greater the certainty value Cv(c) of the object (c) is. Namely, the certainty value Cv(c) of the object (c) is higher as the ratio of strength of the sonar reflected wave to the strength of the sonar transmission wave is greater. For example, in many cases, if an object (c) is a side wall of a building, the reflectance of the sonar transmission wave is greater as compared to a case where the object (c) is a pedestrian, and thus, the certainty value Cv(c) is greater.

The sonar control section 33e transmits "sonar object information" to the ICS-ECU 22 after execution of the sonar object detection processing. When a sonar detected object is detected, the sonar object information includes "the position and the speed" of the sonar detected object with respect to the vehicle 10, the identifier, and the certainty value Cv(c) of the sonar detected object. When a plurality of the sonar detected objects are detected, sonar object information includes a plurality of combinations of "the position, the speed, the identifier and the certainty value Cv(c)" for each of the sonar detected objects.

(Configuration—Others)

The engine ECU 23 controls an engine 41 and a transmission 42 so as to control drive force of the vehicle 10 (see FIG. 2). The engine ECU 23 is connected to a plurality of engine sensors 43 and receives detection signals from these sensors. The engine sensors 43 detect operation state quantities (parameters) of the engine 41. The engine sensors 43 include an accelerator pedal operation amount sensor, a throttle valve opening sensor, an engine rotational speed sensor, an intake air amount sensor. The engine ECU 23 determines a required drive torque Dreq which is a required value of a "drive torque Dd on the basis of a vehicle speed Vt which is the travelling (moving) speed of the vehicle 10, the output values of the engine sensors 43, and the like. The drive torque Dd is a torque transmitted to drive wheels of the vehicle 10.

In addition, the engine ECU 23 is connected to engine actuators 44, such as a throttle valve actuator and a fuel injection valve, and controls these actuators so as to control the torque generated by the engine 41. The engine ECU 23 controls the engine actuators 44 and the transmission 42 such that the actual value of the drive torque Dd becomes equal to the required drive torque Dreq, to thereby control an acceleration As which is the change amount of the vehicle speed Vt per unit time.

Furthermore, when the engine ECU 23 receives a "drive force control request" including a target drive force Ddtg from the PCS-ECU 21 or the ICS-ECU 22, the engine ECU 23 controls the engine actuators 44 and the transmission 42 such that the actual value of the drive torque Dd coincides with the target drive force Ddtg.

The brake ECU 24 controls a brake mechanism 45 which is formed by hydraulic friction brake apparatus installed on the vehicle 10 (see FIG. 2). The brake ECU 24 is connected to a plurality of brake sensors 46 and receives detection signals from these sensors. The brake sensors 46 detect state quantities used for controlling the brake mechanism 45, and include an operation amount sensor for detecting the operation amount of a brake pedal, pressure sensors of brake oil applied to the brake mechanism 45. The brake ECU 24 determines a required brake force Breq which is a requested value of a brake force Bf on the basis of the vehicle speed Vt, output values of the brake sensors 46, and the like. The brake force Bf is a frictional brake force applied to each of wheels of the vehicle 10.

In addition, the brake ECU 24 is connected to a plurality of brake actuators 47 which are hydraulic actuators of the brake mechanism 45. The brake ECU 24 controls the brake actuators 47 such that the actual value of the brake force Bf coincides with the required brake force Breq so as to control the acceleration As (in this case, negative acceleration (the degree of decrease of the vehicle speed Vt); namely, deceleration).

Furthermore, when the brake ECU 24 receives a "brake force control request" including a target deceleration Dctg from the PCS-ECU 21 or the ICS-ECU 22, the brake ECU 24 controls the brake actuators 47 to make (let) the brake mechanism 45 generate brake force such that the actual magnitude of the acceleration As coincides with the target deceleration Dctg. When a predetermined time elapses since a time in point when the vehicle speed Vt becomes "0" due to the generation of the brake force Bf in accordance with the brake force control request, the brake ECU 24 stops generating brake force using the brake actuators 47.

The HMI-ECU 25 is connected a display 51, a speaker 52, and a vehicle speed sensor 53. The display 51 is a LCD (liquid crystal display) mounted at a position which a driver of the vehicle 10 can view (specifically, in front of the driver's seat; see FIG. 1). Characters, figures, and the like to be displayed on the display 51 are controlled by the HMI-ECU 25.

The speaker 52 is disposed inside the vehicle compartment of the vehicle 10. A warning sound, a voice message, and the like to be played by the speaker 52 are controlled by the HMI-ECU 25. The vehicle speed sensor 53 detects the vehicle speed Vt and outputs a signal indicative of the vehicle speed Vt to the HMI-ECU 25.

When the HMI-ECU 25 receives a "collision alert control request" from the PCS-ECU 21 or the ICS-ECU 22, the HMI-ECU 25 displays characters and figures (i.e., alert message) expressing that the vehicle 10 is highly likely to collide with an object in front of the vehicle 10 on the display 51, and causes the speaker 52 to reproduce a warning sound. When the vehicle speed Vt becomes "0" after receiving the collision alert control request, the HMI-ECU 25 stops displaying the alert message on the display 51 and stops reproducing the warning sound through the speaker 52.

(Collision Avoidance Control)

Each of the PCS-ECU 21 and the ICS-ECU 22 executes the "collision avoidance control." The collision avoidance control is a control to execute "alert processing" and "brake processing" when it is determined that there is a high possibility that the vehicle 10 collides with an object.

The alert processing is a processing to display the alert message on the display 51 and to cause the speaker 52 to reproduce the warning sound. The brake processing is a processing to decrease the vehicle speed Vt by controlling the engine ECU 23 and the brake ECU 24. An object which is to be subjected to the collision avoidance control (namely, an object which is determined to be highly likely to collide with the vehicle 10, and thus, for which the collision avoidance control should be executed) is also referred to as a "control target object."

The collision avoidance control executed by the PCS-ECU 21 is referred to as a "PCS control." The collision avoidance control executed by the ICS-ECU 22 includes a "first ICS control" and a "second ICS control." Those controls will next be described.

(Collision Avoidance Control—PCS Control)

The control target object of the PCS control is (includes) the camera detected object which satisfies both a condition (a1) and a condition (a2) described below, and the radar detected object which satisfies both a condition (b1) and a condition (b2) described below. In the present embodiment, a lateral distance threshold Dyth referenced (used) in the condition (a1) and the condition (b1) is 1 meter (see FIG. 1). Calculation methods of a collision time Tcc(a) used in the condition (a2) and a collision time Tcr(b) referenced (used) in the condition (b2) will be described later. The collision time Tcc(a) is sometimes referred to as a "time to collision Tcc(a)."

Condition (a1): the magnitude of the lateral position Dcy(a) is less (smaller) than the lateral distance threshold Dyth (namely, |Dcy(a)|<Dyth).

Condition (a2): the collision time Tcc(a) is a positive value and less than a predetermined time threshold Tth (namely, 0<Tcc(a)<Tth).

Condition (b1): the magnitude of the lateral position Dry(b) is less than the lateral distance threshold Dyth (namely, |Dry(b)|<Dyth). Condition (b2): the collision time Tcr(b) is a positive value and less than the time threshold Tth (namely, 0<Tcr(b)<Tth).

In order to obtain the collision time Tcc(a) of the object (a), the PCS-ECU 21 figures out a longitudinal moving distance $\Delta Dcx(a)$ of the camera detected object in accordance with the following expression (1).

$$\Delta Dcx(a) = Dcx(a) - Dcxp(a) \quad (1)$$

The longitudinal position Dcx(a) referenced in the expression (1) is a value contained in the latest (newest) camera object information received from the front camera 31 (namely, the camera object information related to the latest image). The previous longitudinal position Dcxp(a) is the longitudinal position Dcx(a) related to the same camera detected object contained in the camera object information received from the front camera 31 just before (prior to) the latest camera object information (namely, the camera object information related to the previous image). Therefore, the longitudinal moving distance $\Delta Dcx(a)$ represents the change amount of the longitudinal position Dcx(a) related to the object (a) during the lapse of the time interval $\Delta Tc$. If an object (a) is approaching the vehicle 10 in the x-axis direction, the longitudinal moving distance $\Delta Dcx(a)$ of the object (a) becomes a negative value.

Subsequently, the PCS-ECU 21 figures out a longitudinal relative speed Vcx(a) by dividing the longitudinal moving distance $\Delta Dcx(a)$ by the time interval $\Delta Tc$ (namely, Vcx(a)=$\Delta Dcx(a)/\Delta Tc$). Furthermore, the PCS-ECU 21 obtains (figures out) the collision time Tcc(a) in accordance with the following expression (2).

$$Tcc(a) = (-1) \times Dcx(a)/Vcx(a) \quad (2)$$

Meanwhile, the PCS-ECU 21 figures out the collision time Tcr(b) of the radar detected object in accordance with the following expression (3). Notably, if an object (b) is approaching the vehicle 10 in the x-axis direction, the longitudinal relative speed Vrx(b) of the object (b) becomes a negative value.

$$Tcr(b) = (-1) \times Drx(b)/Vrx(b) \quad (3)$$

If the control target object of the PCS control is present and the vehicle speed Vt is greater than a predetermined first speed threshold Vth1 (namely, Vt>Vth1), the PCS-ECU 21 starts to execute the alert processing and the brake processing. In the present embodiment, the first speed threshold Vth1 is 10 km/h.

The brake processing will now be described in detail. If the control target object is the camera detected object, the PCS-ECU 21 obtains (figures out) the target deceleration Dctg in accordance with the following expression (4). Specifically, the target deceleration Dctg is the magnitude of the acceleration As necessary for the vehicle 10 to stop at a position away from the object (a) by a predetermined stopping position margin Lv. Therefore, the target deceleration Dctg is a value which is greater than "0."

$$Dctg = (1/2) \times (Vcx(a))^2/(Dcx(a) - Lv) \quad (4)$$

Meanwhile, if the control target object is the radar detected object, the PCS-ECU 21 obtains (figures out) the target deceleration Dctg in accordance with the following expression (5).

$$Dctg=(1/2)\times(Vrx(b))^2/(Drx(b)-Lv) \quad (5)$$

When the target deceleration Dctg is obtained, the PCS-ECU 21 transmits the brake force control request including that target deceleration Dctg to the brake ECU 24. Furthermore, the PCS-ECU 21 transmits the drive force control request including the target drive torque Ddtg which is set to "0" to the engine ECU 23. Namely, the brake processing of the PCS control is started to be executed so as to decrease the vehicle speed Vt such that the vehicle 10 stops at the position away from the control target object by the stopping position margin Lv.

Furthermore, the PCS-ECU 21 transmits the collision alert control request to the HMI-ECU 25 so as to start the alert processing. In addition, the PCS-ECU 21 transmits a "control starting notification" to the ICS-ECU 22 so as to notify the ICS-ECU 22 that the collision avoidance control (namely, the PCS control) is started to be executed.

(Collision Avoidance Control—Transmission of Specific Object Information)

Furthermore, when an object which is determined to be a "specific object" as described below is present, the PCS-ECU 21 transmits, as "specific object information" to the ICS-ECU 22, information about the specific object which includes an "average longitudinal position Dax and an average lateral position Day" of the specific object, described later. The ICS-ECU 22 determines whether or not the object identified by the specific object information received from the PCS-ECU 21 is the control target object of the second ICS control.

When an object (hereinafter, also referred to as a "candidate object") satisfies all of a condition (c1) to a condition (c4) described below, the PCS-ECU 21 determines that the candidate object is the specific object. A first duration time threshold Td1 referenced (used) in the condition (c3) is a value which is greater than the time interval ΔTc and is 1 second in the present embodiment. A second duration time threshold Td2 referenced (used) in the condition (c4) is a value which is greater than the time interval ΔTr and is 1 second in the present embodiment.

Condition (c1): the candidate object is detected by each of the front camera 31 and the radar apparatus 32. Namely, the candidate object is the camera detected object and the radar detected object.

Condition (c2): the object type of the candidate object is the "pedestrian."

Condition (c3): the candidate object has continuously been detected as the camera detected object for the first duration time threshold Td1 or more.

Condition (c4): the candidate object has continuously been detected as the radar detected object for the second duration time threshold Td2 or more.

When an object which is the camera detected object and the radar detected object satisfies both of a condition (d1) and a condition (d2) described below, the PCS-ECU 21 determines that the object (namely, candidate object) has been detected by the front camera 31 and the radar apparatus 32 respectively (namely, the condition (c1) is satisfied).

Condition (d1): the magnitude of the difference between the longitudinal position Dcx(a) of the camera detected object and the longitudinal position Drx(b) of the radar detected object is less/smaller than a predetermined separation distance threshold Dsth (namely, |Dcx(a)−Drx(b)|<Dsth).

Condition (d2): the magnitude of the difference between the lateral position Dcy(a) of the camera detected object and the lateral position Dry(b) of the radar detected object is less/smaller than the separation distance threshold Dsth (namely, |Dcy(a)−Dry(b)|<Dsth).

In addition, when the object type of the candidate object (specifically, the camera detected object) has been determined to be the "pedestrian" by the image processing, section 31b, the PCS-ECU 21 determines that the condition (c2) is satisfied.

When a specific object is present, the PCS-ECU 21 obtains (figures out) "an average longitudinal position Dax and an average lateral position Day" of the specific object. The average longitudinal position Dax is an average value of "the longitudinal position Dcx(a) of the specific object detected as the camera detected object and the longitudinal position Drx(b) of the specific object detected as the radar detected object" (namely, Dax=(Dcx(a)+Drx(b))/2). The average lateral position Day is an average value of "the lateral position Dcy(a) of the specific object detected as the camera detected object and the lateral position Dry(b) of the specific object detected as the radar detected object" (namely, Day=(Dcy(a)+Dry(b))/2).

The PCS-ECU 21 transmits the obtained average longitudinal position Dax and the obtained average lateral position Day to the ICS-ECU 22 as the specific object information. When a plurality of specific objects are detected, the specific object information contains a plurality of pairs of the average longitudinal position Dax and the average lateral position Day.

(Collision Avoidance Control—First ICS control)

The control target object of the first ICS control is the sonar detected object which satisfies all of a condition (e1) to a condition (e3) described below. In the present embodiment, a longitudinal distance threshold Dxth referenced/used in the condition (e2) is 2 meters (see FIG. 1). A predetermined first certainty threshold Cth1 referenced/used in the condition (e3) is greater than "0" and less than the maximum certainty value Cmax (namely, 0<Cth1<Cmax).

Condition (e1): the magnitude of the lateral position Dsy(c) is less than the lateral distance threshold Dyth (namely, |Dsy(c)|<Dyth).

Condition (e2): the longitudinal position Dsx(c) is less than the longitudinal distance threshold Dxth (namely, Dsx(c)<Dxth).

Condition (e3): the certainty value Cv(c) is greater than the first certainty threshold Cth1 (namely, Cv(c)>Cth1).

When the control target object of the first ICS control is present, and the vehicle speed Vt is greater than "0" and less than a predetermined second speed threshold Vth2 (namely, 0<Vt<Vth2), the ICS-ECU 22 starts to execute the first ICS control.

Namely, the ICS-ECU 22 executes the alert processing and the brake processing. When the ICS-ECU 22 executes the brake processing, the ICS-ECU 22 obtains (figures out) the target deceleration Dctg related to the control target object in accordance with the following expression (6).

$$Dctg=(1/2)\times(Vsx(c))^2/(Dsx(c)-Lv) \quad (6)$$

When the target deceleration Dctg is obtained, the ICS-ECU 22 transmits the brake force control request including the target deceleration Dctg to the brake ECU 24. Furthermore, the ICS-ECU 22 transmits the drive force control request including the target drive torque Ddtg which is set to "0" to the engine ECU 23. Namely, the brake processing is executed so as to decrease the vehicle speed Vt such that the vehicle 10 stops at a position away from the control target object by the stopping position margin Lv.

Furthermore, the ICS-ECU 22 transmits the collision alert control request to the HMI-ECU 25 so as to start the alert processing. In addition, the ICS-ECU 22 transmits the control starting notification to the PCS-ECU 21 so as to notify the PCS-ECU 21 that the collision avoidance control (namely, the first ICS control) is started to be executed.
(Collision Avoidance Control—Second ICS control)

The control target object of the second ICS control is the sonar detected object which satisfies all of "the condition (e1) and the condition (e2), and a condition (f1) and a condition (f2) described below." A predetermined second certainty threshold Cth2 referenced/used in the condition (f1) is greater than "0" and less than the first certainty threshold Cth1 (namely, 0<Cth2<Cth1). The sonar detected object which satisfies the condition (e3) or the condition (f2) is also referred to as a "monitoring target object" for convenience' sake.

Condition (f1): the certainty value Cv is greater than the second certainty threshold Cth2 (namely, Cv(c)>Cth2).

Condition (f2): the sonar detected object has also been detected as the specific object.

The condition (f2) is satisfied, when "the sonar detected object which satisfies the condition (e1), the condition (e2) and the condition (f1)" is detected as the specific object. Specifically, when the sonar detected object satisfies both a condition (g1) and a condition (g2) described below, the ICS-ECU 22 determines that the condition (f2) is satisfied.

Condition (g1): the magnitude of the difference between the longitudinal position Dsx(c) of the sonar detected object and the average longitudinal position Dax of the specific object is less/smaller than the separation distance threshold Dsth (namely, |Dsx(a)−Dax|<Dsth)

Condition (g2): the magnitude of the difference between the lateral position Dsy(c) of the sonar detected object and the average lateral position Day of the specific object is less/smaller than the separation distance threshold Dsth (namely, |Dsy(a)−Day|<Dsth).

When the control target object of the second ICS control is present, and the vehicle speed Vt is greater than "0" and less than the second speed threshold Vth2 (namely, 0<Vt<Vth2), the ICS-ECU 22 starts to execute the second ICS control in a similar way to a case where the first ICS control is executed.

Namely, the ICS-ECU 22 obtains the target deceleration Dctg in accordance with the above-described expression (6), and transmits the brake force control request including the target deceleration Dctg to the brake ECU 24. In addition, the ICS-ECU 22 transmits the drive force control request including the target drive torque Ddtg which is set to "0" to the engine ECU 23. Namely, the ICS-ECU 22 executes the brake processing.

Furthermore, the ICS-ECU 22 transmits the collision alert control request to the HMI-ECU 25 so as to start the alert processing. In addition, the ICS-ECU 22 transmits the control starting notification to the PCS-ECU 21 so as to notify the PCS-ECU 21 that the collision avoidance control (in this case, the second ICS control) is started to be executed.

A condition which is satisfied in a case where all of the condition (e1), the condition (e2) and the condition (e3) are satisfied, and the vehicle speed Vt is greater than "0" and less than the second speed threshold Vth2, is also referred to as an "execution condition" or a "first ICS avoidance control starting condition" for convenience' sake. Similarly, a condition which is satisfied in a case where all of the condition (e1), the condition (e2), the condition (f1) and the condition (f2) are satisfied, and the vehicle speed Vt is greater than "0" and less than the second speed threshold Vth2, is also referred to as an "execution condition" or a "second ICS avoidance control starting condition" for convenience' sake.
(Specific Operation)

Next, specific operations of the PCS-ECU 21 and the ICS-ECU 22 will be described with reference to FIG. 4 and FIG. 5, respectively. The CPU of the PCS-ECU 21 (also referred to as "the PCS-CPU" for simplification) executes a "PCS collision avoidance control routine" represented by a flowchart shown in FIG. 4 every time a predetermined time which is shorter than each of the time interval ΔTc and the time interval ΔTr elapses.

Figure 4:
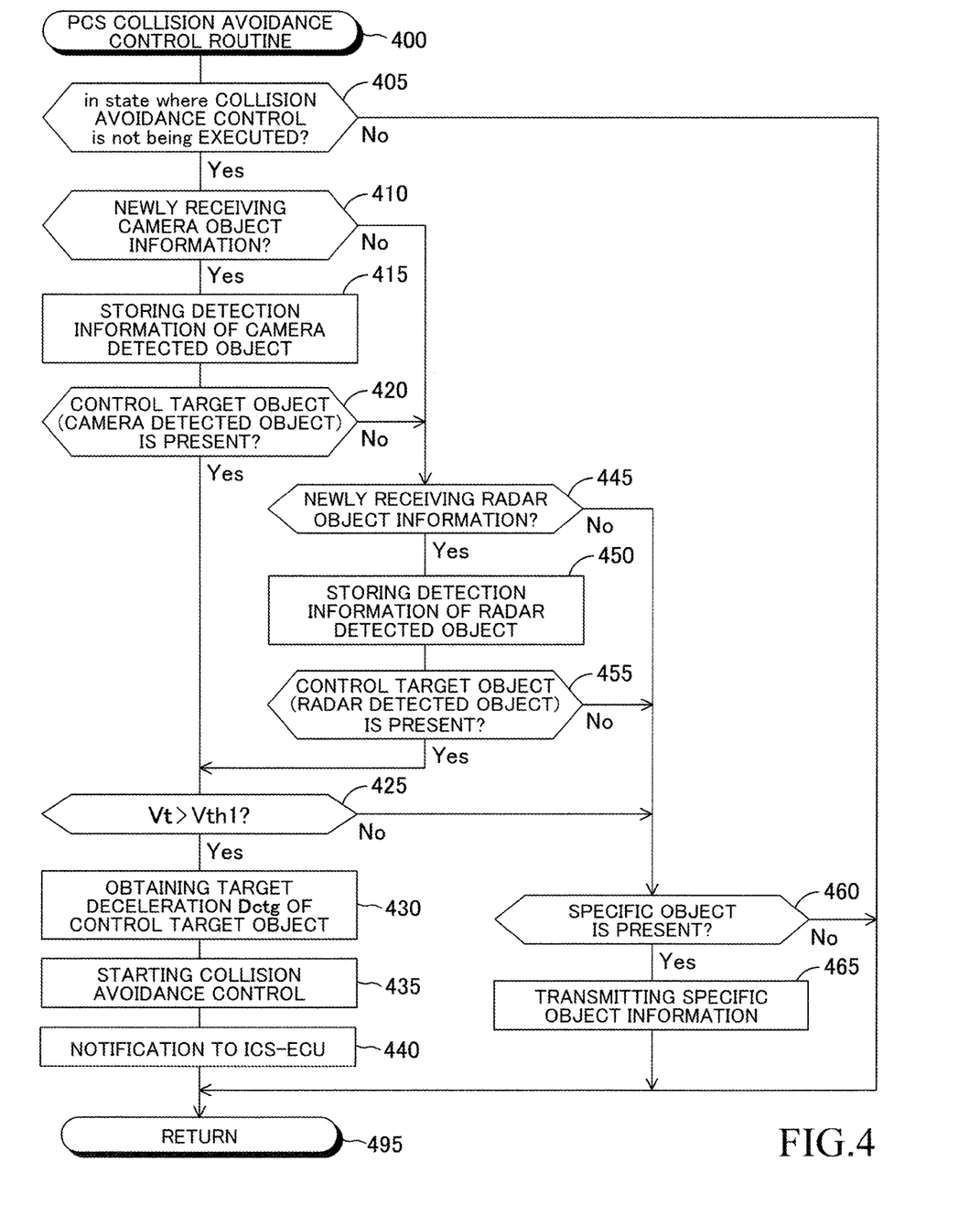
FIG. 4 is a flowchart representing a PCS collision avoidance control routine executed by the present assistance apparatus.

Therefore, when an appropriate timing has come, the PCS-CPU starts the process from step 400 of FIG. 4 and proceeds to step 405 so as to determine whether or not a current state is a state where the collision avoidance control is not being executed. If the present time is neither included in a period (p1) nor a period (p2) described below, the PCS-CPU determines that the current state is the state where the collision avoidance control is not being executed.

Period (p1): a period from a point in time when the PCS-ECU 21 starts the PCS control to a point in time when the vehicle speed Vt becomes "0."

Period (p2): a period from a point in time when the PCS-ECU 21 receives the control starting notification from the ICS-ECU 22 to a point in time when the vehicle speed Vt becomes "0."

(Case A) In a case where the collision avoidance control is not being executed and neither the control target object nor the specific object is detected It is now assumed that the collision avoidance control is not being executed and neither the control target object nor the specific object is detected. In addition, it is also assumed that the PCS-ECU 21 has newly received both the camera object information from the front camera 31 and the radar object information from the radar apparatus 32 respectively in a period (referred to as a "PCS not-executed period") from a point in time when the present routine was executed last time to the present time.

In this case, since the collision avoidance control is not being executed, the PCS-CPU makes a "Yes" determination in step 405 and proceeds to step 410 so as to determine whether or not the PCS-ECU 21 has newly received the camera object information in the PCS not-executed period.

According to the assumption described above, the PCS-ECU 21 has newly received the camera object information, and thus, the PCS-CPU makes a "Yes" determination in step 410 and proceeds to step 415 so as to store, in the RAM, information related to the camera detected object contained in the camera object information which has been newly received. That is, the PCS-CPU stores the newly received detection information of the camera detected object in the RAM.

At this time, if the object type of the camera detected object related to the camera object information which has been newly received (namely, the latest camera object information) is the "pedestrian", and the information related to the camera detected object was also contained in the camera object information which was received just before (prior to) the latest camera object information (namely, the pedestrian has been detected continuously as the camera detected object), the PCS-CPU obtains a period during which the camera detected object has been continuously detected (a detection period of the camera detected object). In this case, the PCS-CPU stores the detection period of the camera detected object as well as the detection information in the RAM of the PCS-ECU 21.

Meanwhile, if information related to the camera detected object contained in the camera object information which was received just before (prior to) the latest camera object information is not contained in the latest camera object information, the PCS-CPU deletes the information related to the camera detected object from the RAM.

Subsequently, the PCS-CPU proceeds to step 420 so as to determine whether or not the camera detected object which is (can be) qualified as the control target object is present. Namely, the PCS-CPU determines whether or not the camera detected object related to the latest camera object information satisfies both the condition (a1) and the condition (a2) described above.

According to the assumption described above, no camera detected object which is qualified as the control target object is present, and thus, the PCS-CPU makes a "No" determination in step 420 and proceeds to step 445 so as to determine whether or not the PCS-ECU 21 has newly received the radar object information in the PCS not-executed period.

According to the assumption described above, since the PCS-ECU 21 has newly received the radar object information, the PCS-CPU makes a "Yes" determination in step 445 and proceeds to step 450 so as to store, in the RAM, information related to the radar detected object contained in the radar object information which has been newly received. That is, the PCS-CPU stores the newly received detection information of the radar detected object in the RAM.

At this time, if the radar detected object related to the radar object information which has been newly received (namely, the latest radar object information) was also contained in the radar object information which was received just before (prior to) the latest radar object information, the PCS-CPU obtains a period during which the radar detected object has been continuously detected (a detection period of the radar detected object). In this case, the PCS-CPU stores the detection period of the radar detected object as well as the detection information in the RAM of the PCS-ECU 21.

Meanwhile, if information related to the radar detected object contained in the radar object information which was received just before (prior to) the latest radar object information is not contained in the latest radar object information, the PCS-CPU deletes the information related to the radar detected object from the RAM.

Subsequently, the PCS-CPU proceeds to step 455 so as to determine whether or not the radar detected object which is (can be) qualified as the control target object is present. Namely, the PCS-CPU determines whether or not the radar detected object related to the latest radar object information satisfies both the condition (b1) and the condition (b2) described above.

According to the assumption described above, no radar detected object which is qualified as the control target object is present, and thus, the PCS-CPU makes a "No" determination in step 455 and proceeds to step 460 so as to determine whether or not the specific object is present. Namely, the PCS-CPU determines whether or not an object which satisfies all of the condition (c1) to the condition (c4) is present on the basis of "the detection information and the detection period of the camera detected object" stored in the RAM and "the detection information and the detection period of the radar detected object" stored in the RAM.

According to the assumption described above, no specific object is present, the PCS-CPU makes a "No" determination in step 460 and proceeds to step 495 so as to end the present routine.

(Case B) In a case where the control target object among the camera detected objects is detected It is assumed that, thereafter, the control target object among the camera detected objects is detected and the vehicle speed Vt is greater than the first speed threshold Vth1.

In this case, since the control target object among the camera detected objects is present, the PCS-CPU makes a "Yes" determination in step 420 and proceeds to step 425 so as to determine whether or not the vehicle speed Vt is greater than the first speed threshold Vth1. According to the assumption described above, the vehicle speed Vt is greater than the first speed threshold Vth1, and thus, the PCS-CPU makes a "Yes" determination in step 425 and proceeds to step 430.

When the PCS-CPU proceeds to step 430, the PCS-CPU executes processes from step 430 to step 440 described below one after another, and then proceeds to step 495.

Step 430: the PCS-CPU obtains (figures out) the target deceleration Dctg related to the control target object. In this case, since the control target object is the camera detected object, the PCS-CPU obtains the target deceleration Dctg in accordance with the above-described expression (4).

Step 435: the PCS-CPU starts the collision avoidance control. Namely, the PCS-CPU transmits the brake force control request including the target deceleration Dctg to the brake ECU 24. In addition, the PCS-CPU transmits the drive force control request including the target drive torque Ddtg which is set to "0" to the engine ECU 23. Furthermore, the PCS-CPU transmits the collision alert control request to the HMI-ECU 25.

Step 440: the PCS-CPU transmits the control starting notification to the ICS-ECU 22.

(Case C) In a case where the control target object among the radar detected objects is detected It is assumed that the control target object among the radar detected objects is detected and the vehicle speed Vt is greater than the first speed threshold Vth1. In addition, it is also assumed that no control target object among the camera detected objects is detected.

In this case, the PCS-CPU makes a "Yes" determination in step 455 and proceeds to step 425. According to the assumption described above, the vehicle speed Vt is greater than the first speed threshold Vth1, and thus, the PCS-CPU makes a "Yes" determination in step 425 and proceeds to step 430. In this case, since the control target object is the radar detected object, the PCS-CPU obtains the target deceleration Dctg in accordance with the above-described expression (5). Subsequently, the PCS-CPU executes processes of step 435 and step 440.

(Case D) In a case where the specific object is detected.

It is assumed that the specific object is detected while no control target object is detected.

In this case, the PCS-CPU makes a "Yes" determination in step 460 and proceeds to step 465 so as to transmit the specific object information to the ICS-ECU 22. Subsequently, the PCS-CPU proceeds to step 495.

(Case E) In a case where the collision avoidance control is being executed

It is assumed that the collision avoidance control has already been started but the vehicle speed Vt has not become "0" yet at the present time.

In this case, the PCS-CPU makes a "No" determination in step 405 and proceeds to step 495 directly.

Notably, in a case where the determination condition of step 425 is not satisfied (namely, the vehicle speed Vt is equal to or lower than the first speed threshold Vth1), the PCS-CPU makes a "No" determination in step 425 and proceeds to step 460.

In addition, in a case where the determination condition of step 410 is not satisfied (namely, PCS-ECU 21 has not newly received camera object information in the PCS not-executed period), the PCS-CPU makes a "No" determination in step 410 and proceeds to step 445. Furthermore, in a case where the determination condition of step 445 is not satisfied (namely, the PCS-ECU 21 has not newly received radar object information in the PCS not-executed period.), the PCS-CPU makes a "No" determination in step 445 and proceeds to step 460.

Next, the operation of the ICS-ECU 22 will be described. The CPU of the ICS-ECU 22 (also referred to as an "ICS-CPU" for simplification) executes an "ICS collision avoidance control routine" represented by a flowchart shown in FIG. 5 every time a predetermined time which is shorter than the time interval ΔTs elapses.

Figure 5:
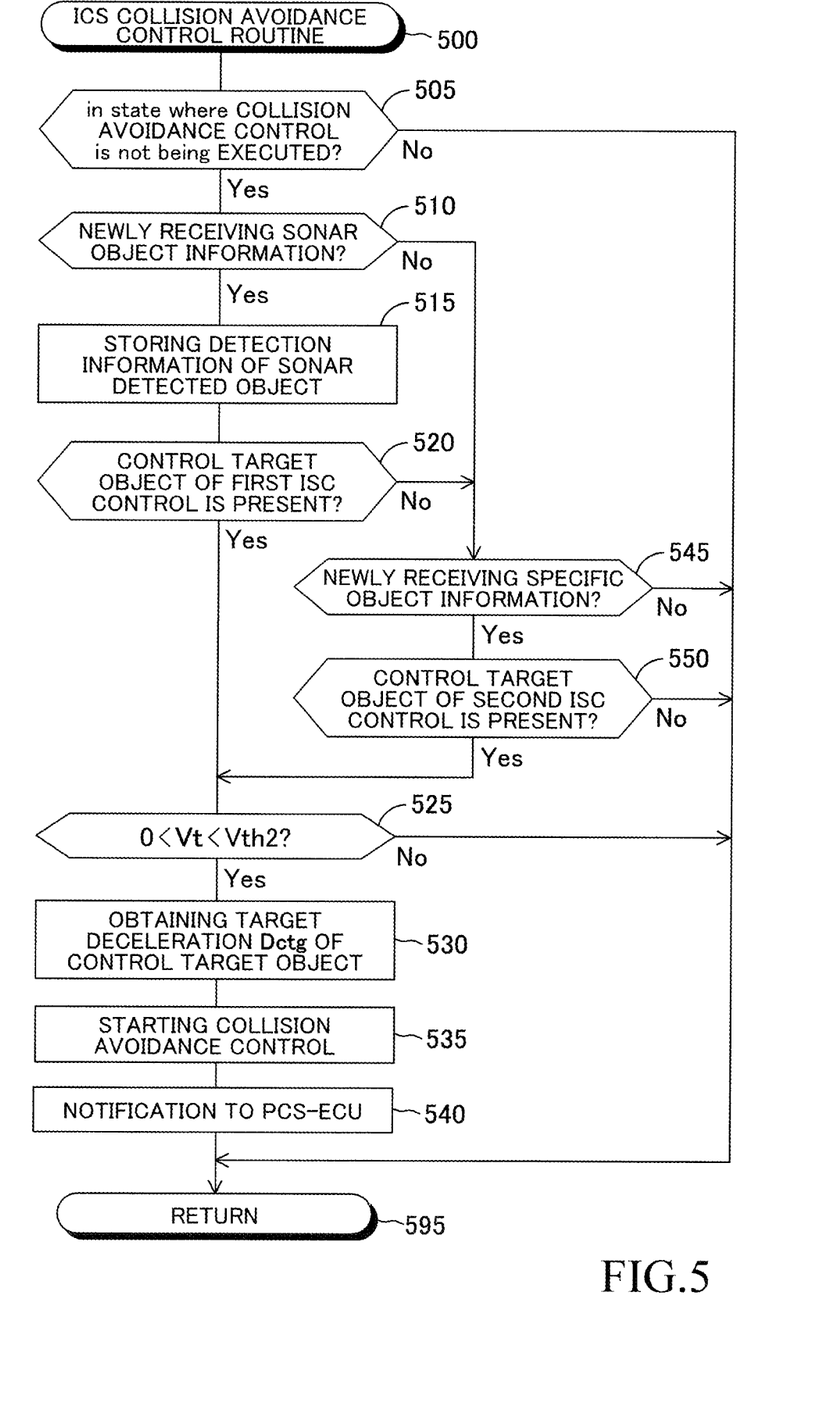
FIG. 5 is a flowchart representing an ICS collision avoidance control routine executed by the present assistance apparatus.

Therefore, when an appropriate timing has come, the ICS-CPU starts the process from step 500 of FIG. 5 and proceeds to step 505 so as to determine whether or not a current state is a state where the collision avoidance control is not being executed. If the present time is neither included in a period (p3) nor a period (p4) described below, the ICS-CPU determines that the current state is the state where the collision avoidance control is not being executed.

Period (p3): a period from a point in time when the ICS-ECU 22 starts the first ICS control or the second ICS control to a point in time when the vehicle speed Vt becomes "0."

Period (p4): a period from a point in time when the ICS-ECU 22 receives the control starting notification from the PCS-ECU 21 to a point in time when the vehicle speed Vt becomes "0."

(Case F) In a case where the collision avoidance control is not being executed and neither the control target object of the first ICS control nor the control target object of the second ICS control is detected It is now assumed that the collision avoidance control is not being executed and neither the control target object of the first ICS control nor the control target object of the second ICS control is detected. In addition, it is also assumed that the ICS-ECU 22 has newly received the sonar object information from the sonar apparatus 33 and the ICS-ECU 22 has not newly received the specific object information from the PCS-ECU 21 in a period (referred to as a "ICS not-executed period") from a point in time when the present routine was executed last time to the present time.

In this case, since the collision avoidance control is not executed, the ICS-CPU makes a "Yes" determination in step 505 and proceeds to step 510 so as to determine whether or not the ICS-ECU 22 has newly received the sonar object information from the sonar apparatus 33 in the ICS not-executed period.

According to the assumption described above, the ICS-ECU 22 has newly received the sonar object information, and thus, the ICS-CPU makes a "Yes" determination in step 510 and proceeds to step 515 so as to store, in the RAM of the ICS-CPU, "information related to the sonar detected object" contained in the sonar object information which has been newly received. That is, the ICS-CPU stores the newly received detection information of the sonar detected object in the RAM.

Subsequently, the ICS-CPU proceeds to step 520 so as to determine whether or not the control target object of the first ICS control is present. Namely, the ICS-CPU determines whether or not the sonar detected object related to the latest sonar object information satisfies all of the condition (e1) to the condition (e3) described above.

According to the assumption described above, no control target object of the first ICS control is present, and thus, the ICS-CPU makes a "No" determination in step 520 and proceeds to step 545 so as to determine whether or not the ICS-ECU 22 has newly received the specific object information in the ICS not-executed period.

According to the assumption described above, ICS-ECU 22 has not newly received the specific object information in the ICS not-executed period, and thus, the ICS-CPU makes a "No" determination in step 545 and proceeds to step 595 directly. In step 595, the ICS-CPU ends the present routine.

(Case G) In a case where the control target object of the first ICS control is detected It is assumed that, thereafter, the control target object of the first ICS control is detected and the vehicle speed Vt is greater than "0" and less than the second speed threshold Vth2.

In this case, since the control target object of the first ICS control is present, and thus, the ICS-CPU makes a "Yes" determination in step 520 and proceeds to step 525 so as to determine whether or not the vehicle speed Vt is greater than "0" and less than the second speed threshold Vth2. According to the assumption described above, the vehicle speed Vt is greater than "0" and less than the second speed threshold Vth2, and thus, the ICS-CPU makes a "Yes" determination in step 525 and proceeds to step 530.

When the ICS-CPU proceeds to step 530, the ICS-CPU executes processes from step 530 to step 540 described below one after another, and then proceeds to step 595.

Step 530: the ICS-CPU obtains (figures out) the target deceleration Dctg related to the control target object in accordance with the above-described expression (6).

Step 535: the ICS-CPU starts the collision avoidance control. Namely, the ICS-CPU transmits the brake force control request including the target deceleration Dctg to the brake ECU 24. In addition, the ICS-CPU transmits the drive force control request including the target drive torque Ddtg which is set to "0" to the engine ECU 23. Furthermore, the ICS-CPU transmits the collision alert control request to the HMI-ECU 25.

Step 540: the ICS-CPU transmits the control starting notification to the PCS-ECU 21.

(Case H) In a case where the control target object of the second ICS control is detected Meanwhile, it is assumed that the ICS-ECU 22 has newly received the specific object information from the PCS-ECU 21 in the ICS not-executed period and the specific object related to the specific object information is the control target object of the second ICS control. In addition, it is also assumed that the vehicle speed Vt is greater than "0" and less than the second speed threshold Vth2.

In this case, since the ICS-ECU 22 has newly received the specific object information containing information of the specific object which is qualified as the control target object of the second ICS control, the ICS-CPU makes a "Yes" determination in step 545 and proceeds to step 550.

In step 550, the ICS-CPU determines whether or not the control target object of the second ICS control is present.

Namely, the ICS-CPU determines whether or not the sonar detected object related to the latest sonar object information satisfies all of the condition (e1) to the condition (e2) and the condition (f1) to the condition (f2) described above on the basis of the information related to the sonar object information stored in the RAM.

According to the assumption described above, the control target object of the second ICS control is present, and thus, the ICS-CPU makes a "Yes" determination in step 550 and proceeds to step 525. In this case, since the vehicle speed Vt is greater than "0" and less than the second speed threshold Vth2, the ICS-CPU makes a "Yes" determination in step 525 and executes processes of step 530 to step 540. Namely, the second ICS control is executed.

(Case I) In a case where the collision avoidance control is being executed

It is assumed that the collision avoidance control has already been started but the vehicle speed Vt has not become "0" yet at the present time.

In this case, the ICS-CPU makes a "No" determination in step 505 and proceeds to step 595 directly.

Notably, in a case where the determination condition of step 510 is not satisfied (namely, the ICS-ECU 22 has not newly received the sonar object information from the sonar apparatus 33 in the ICS not-executed period), the ICS-CPU makes a "No" determination in step 510 and proceeds to step 545. In addition, in a case where the determination condition of step 550 is not satisfied (namely, no control target object of the second ICS control is present), the ICS-CPU makes a "No" determination in step 550 and proceeds to step 595 directly. Furthermore, in a case where the determination condition of step 525 is not satisfied (namely, the vehicle speed Vt is equal to "0" or the vehicle speed Vt is equal to or greater than the second speed threshold Vth2), the ICS-CPU makes a "No" determination in step 525 and proceeds to step 595 directly.

As having been described above, when the object (c) detected by the sonar apparatus 33 is the same as the specific object, the second certainty threshold Cth2 which is less/smaller than the first certainty threshold Cth1 is adopted/employed in determining whether or not the object (c) is the control target object. The object type of the specific object is the "pedestrian." Therefore, according to the present assistance apparatus, though a pedestrian (namely, the low certainty object) is detected as the object (c), the object (c) is regarded/treated as the control target object (namely, the collision avoidance control is executed for the object (c)) if the object (c) satisfies the second ICS avoidance control starting condition which includes not only "the condition related to the certainty value Cv" but also the other conditions described above.

Meanwhile, when the object (c) is not the specific object (namely, when the object (c) is not a pedestrian), the first certainty threshold Cth1 is adopted/employed in determining whether or not the object (c) is the control target object. Therefore, according to the present assistance apparatus, occurrence of a phenomenon in which the collision avoidance control is executed for an object which does not actually present (namely, occurrence of the unnecessary control) can be avoided as much as possible.

In addition, the time period in which the candidate object has been continuously detected is considered in determining whether or not the candidate object is the specific object as described above. Namely, it is necessary for the candidate object to satisfy the condition (c3) and the condition (c4) in order to be determined to be the specific object. Therefore, according to the present assistance apparatus, occurrence of the unnecessary control can be avoided appropriately.

Furthermore, the PCS-ECU 21 can be designed/modified by adding "the feature for transmitting the specific object information in a case where the specific object is detected" to a conventional PCS-ECU which receives object information from the front camera and the radar apparatus. In this case, the ICS-ECU 22 can be designed/modified by adding "the feature for extract the control target object on the basis of the specific object in a case where the specific object information is received" to a conventional ICS-ECU which receives object information from the sonar apparatus. Namely, the present assistance apparatus can be configured easily by means of utilizing the conventional driving assistance apparatuses.

The embodiment of the driving assistance apparatus according to the present disclosure has been described; however, the present disclosure is not limited to the above-described embodiment, and various modifications are possible without departing from the scope of the disclosure. For example, functions provided by the PCS-ECU 21 and the ICS-ECU 22 may be provided by a single ECU. Furthermore, functions provided by each of the PCS-ECU 21 and the ICS-ECU 22 may be provided by a plurality of ECUs.

In addition, in the present embodiment, the specific object is the object which satisfies all the condition (c1) to the condition (c4). However, a part of or all of these conditions except for the condition (c2) (namely, the condition (c1), the condition (c3) and the condition (c4)) may be omitted.

In addition, the object type related to the condition (c2) (namely, the specific type) is the "pedestrian." However, the specific type may be another object type than the "pedestrian." Alternatively, the specific types may be the "pedestrian" and other object types than the "pedestrian." For example, the specific types may be the "pedestrian" and a "bicycle." That is, the specific type used to determine whether an object is the specific object may be a type of an object which has the relatively low reflectance of the sonar transmission wave, as compared to the wall of the building.

In addition, in the present embodiment, the first object detecting sensor is the sonar apparatus 33 and the second object detecting sensor is the front camera 31. However, one or both of the first object detecting sensor and the second object detecting sensor may be different from these sensing apparatuses. For example, the first object detecting sensor may be a millimeter wave radar apparatus which is configured to be able to obtain the certainty value Cv. Furthermore, the second object detecting sensor may be a LIDAR (Laser Imaging Detection and Ranging) apparatus which is configured to be able to obtain the object type.

In addition, in the present embodiment, the front camera 31, the radar apparatus 32, and the sonar apparatus 33 are arranged/configured so as to detect an object which is present in front of the vehicle 10. However, each of these apparatuses may be arranged/configured so as to detect an object which is present behind the vehicle 10. In this case, the PCS-ECU 21 and the ICS-ECU 22 execute the collision avoidance control when it is determined that the vehicle 10 is highly likely to collide with the object (namely, the control target object) while the vehicle 10 moves (travels) backward.

In addition, in the present embodiment, the collision avoidance control includes the alert processing and the brake processing. However, the collision avoidance control is different from these kinds of processing. For example, the collision avoidance control may not include the alert processing. Alternatively, the collision avoidance control includes a processing for changing (controlling) the steering angle of the vehicle 10 to avoid the collision in addition to the alert processing and the brake processing.

In addition, in the present embodiment, while the collision avoidance control is being executed for the control target object (namely, in a time period from a point in time when the collision avoidance control is started to a point in time when the vehicle 10 stops travelling (moving)), the PCS-ECU 21 and the ICS-ECU 22 do not determine whether or not another control target object is present. However, the PCS-ECU 21 and the ICS-ECU 22 may be configured to determine, while the collision avoidance control is being executed for the control target object, whether or not to start another collision avoidance control for another control target object.

In this case, for example, when a plurality of the control target objects are detected, the brake mechanism 45 is controlled such that the actual magnitude of the acceleration As coincides with the maximum value of (the magnitude of) the target deceleration Dctg obtained for each of the control target objects. Furthermore, when the specific object is newly detected while the collision avoidance control is being executed for the control target object, the PCS-ECU 21 transmits the specific object information related to that specific object.

In addition, in the present embodiment, the PCS-ECU 21 transmits the specific object information which includes "the average longitudinal position Dax and the average lateral position Day" of the specific object. However, the PCS-ECU 21 may be configure to transmit "the longitudinal position Dcx(a) and the lateral position Dcy(a)" of the specific object as the specific object information. In this case, the ICS-ECU 22 determines whether or not the condition (f2) is satisfied on the basis of "the longitudinal position Dcx(a) and the lateral position Dcy(a)" of the specific object received from the PCS-ECU 21. Namely, in this case, the position of the radar detected object is not considered for determining whether or not the condition (f2) is satisfied.

In addition, in the present embodiment, the ICS-ECU 22 executes the collision avoidance control when the vehicle speed Vt is greater than "0" and less than the second speed threshold Vth2. However, the ICS-ECU 22 may be configured to execute the collision avoidance control when the vehicle speed Vt is "0." In this case, when the collision avoidance control is executed, even if the driver of the vehicle 10 presses (operates) the accelerator pedal, the torque generated by the engine 41 is maintained at "0." Therefore, when the vehicle 10 stops travelling (moving) and the control target object is present in front of the vehicle 10, even if the driver accidentally (erroneously) presses the accelerator pedal instead of the brake pedal, the collision of the vehicle 10 with the control target object is avoided.

In addition, in the present embodiment, the PCS-ECU 21 determines that the condition (c2) and the condition (c3) are satisfied when the camera detected object whose object type is the "pedestrian" has been detected for more than the first duration time threshold Td1 continuously. However, the PCS-ECU 21 may be configured to determine that the condition (c2) and the condition (c3) are satisfied when the camera detected object has been detected for more than the first duration time threshold Td1 continuously and it is determined that the object type is the "pedestrian" during a part or all of a time period in which the camera detected object has been continuously detected.

In addition, in the present embodiment, the ICS-ECU 22 determines whether or not the control target object of the second ICS control is present on the basis of the information of the sonar detected object stored in the RAM of the ICS-ECU 22 (see step 515 of FIG. 5) when the specific object information is newly received. Namely, the processing of step 550 is executed after the ICS-ECU 22 makes a "Yes" determination in step 545. However, the ICS-ECU 22 may be configured to determine whether or not the control target object of the second ICS control is present on the basis of the information of the specific object stored in the RAM of the ICS-ECU 22 when the sonar object information is newly received.

What is claimed is:

1. A driving assistance apparatus comprising:
   a first object detecting sensor device for detecting an object present in a travelling direction of a vehicle as a first object, and obtaining a position and a certainty value of said first object such that said certainty value increases as reliability of said obtained position increases;
   a second object detecting sensor device for detecting an object present in said travelling direction as a second object, and obtaining a position of said second object and information on a type of said second object; and
   a control unit which is implemented by at least one programmed processor and configured to:
      determine whether or not a monitoring target object satisfies a predetermined executing condition on the basis of at least said position obtained by said first object detecting sensor device, said monitoring target object being said first object whose certainty value is determined to be higher than a certainty threshold; and
      execute collision avoidance control in order to avoid collision between said monitoring target object and said vehicle when it is determined that said monitoring target object satisfies said executing condition,
   said control unit further configured to:
      obtain determination result as to whether or not said type of said second object is a specific type;
      determine whether or not said second object is also detected as said first object on the basis of said obtained position of said first object and said obtained position of said second object;
      determine whether or not a threshold application condition is satisfied, said threshold application condition including a condition which is satisfied when it is determined that said second object is also detected as said first object and that said type of said second object is said specific type;
      set said certainty threshold to a predetermined first certainty threshold when it is determined that said threshold application condition is not satisfied; and
      set said certainty threshold to a predetermined second certainty threshold which is smaller than said first certainty threshold when it is determined that said threshold application condition is satisfied.

2. The driving assistance apparatus according to claim 1, wherein
   said control unit is configured to determine whether or not said second object has continuously been detected by said second object detecting sensor device for a time period longer than a predetermined time threshold in order to determine whether or not said threshold application condition is satisfied.

3. The driving assistance apparatus according to claim 2, wherein
   said first object detecting sensor device comprises:
      a transmission section which transmits an electromagnetic wave or a sonic wave as a transmission wave to a predetermined object detecting region; and
      a reception section which receives a reflection wave generated by reflection of said transmission wave at said first object, and
   said first object detecting sensor device is configured to obtain said certainty value on the basis of at least strength of said reflection wave.

4. The driving assistance apparatus according to claim 3, wherein
   said second object detecting sensor device comprises an image obtaining section which obtains an image of a region in said travelling direction as a travelling direction image, and is configured to determine whether or not said type of said second object is said specific type by using said travelling direction image.

5. The driving assistance apparatus according to claim 1, wherein
   said first object detecting sensor device comprises:
      a transmission section which transmits an electromagnetic wave or a sonic wave as a transmission wave to a predetermined object detecting region; and
      a reception section which receives a reflection wave generated by reflection of said transmission wave at said first object, and
   said first object detecting sensor device is configured to obtain said certainty value on the basis of at least strength of said reflection wave.

6. The driving assistance apparatus according to claim 5, wherein
   said second object detecting sensor device comprises an image obtaining section which obtains an image of a region in said travelling direction as a travelling direction image, and is configured to determine whether or not said type of said second object is said specific type by using said travelling direction image.

* * * * *